United States Patent [19]

McNemar

[11] Patent Number: 4,877,167
[45] Date of Patent: Oct. 31, 1989

[54] RETENTION SYSTEM FOR DIVER ACCESSORIES

[76] Inventor: Glenn A. McNemar, 2031 Hillside Dr., Falls Church, Va. 22043

[21] Appl. No.: 204,835
[22] Filed: Jun. 10, 1988
[51] Int. Cl.⁴ .............................................. A45F 5/02
[52] U.S. Cl. ................................... 224/269; 224/252; 224/255; 24/241.S L; 24/302; 24/704.1; 24/453; 405/186; 292/325; 292/318
[58] Field of Search ................ 405/185, 186; 224/182, 224/224, 226, 229, 252, 225, 260, 269; 24/302, 301, 300, 238, 239, 241 SL, 150 FP, 145, 148; 292/318, 317, 325, 327

[56] References Cited

U.S. PATENT DOCUMENTS

| | | |
|---|---|---|
| Re. 31,096 | 12/1982 | Johnston ......................... 24/238 X |
| 619,704 | 2/1899 | Brooks ............................. 292/318 |
| 1,010,763 | 12/1911 | Hogan ........................... 224/224 X |
| 1,131,669 | 3/1915 | Bremer ............................. 224/182 |
| 1,298,402 | 3/1919 | Rogers ............................. 292/318 |
| 1,421,714 | 7/1922 | Puc .................................. 292/318 |
| 2,840,409 | 6/1958 | Ashworth ......................... 292/317 |
| 3,877,098 | 4/1975 | Braly ............................... 405/186 |
| 3,984,900 | 10/1976 | Cirelli ............................... 24/238 |
| 4,029,243 | 6/1977 | Zerobnick et al. ................. 224/224 |
| 4,150,464 | 4/1979 | Tracy ............................ 24/196 X |
| 4,419,874 | 12/1983 | Brentini ........................ 24/238 X |
| 4,614,373 | 9/1986 | Niemeijer ......................... 292/318 |
| 4,633,548 | 1/1987 | Siskind et al. ..................... 24/145 |
| 4,694,772 | 9/1987 | Faulconer et al. ............. 405/185 X |
| 4,765,037 | 8/1988 | Perry ................................ 24/301 |

FOREIGN PATENT DOCUMENTS

| | | | |
|---|---|---|---|
| 320444 | 4/1902 | France ............................. 24/145 |
| 2584581 | 1/1987 | France ............................. 224/182 |
| 161906 | 10/1979 | Netherlands ................... 24/150 FP |

Primary Examiner—Randolph A. Reese
Assistant Examiner—J. Russell McBee
Attorney, Agent, or Firm—Diller, Ramik & Wight

[57] ABSTRACT

A retention system particularly adapted to be used by divers which includes at least one lanyard having first and second ends, a first clip having a hook for securing thereon an implement, such as a dive light, slate, knife, etc., a slidable fastener associated with the first clip for sliding movement between opened and closed positions in the latter of which the implement can not be inadvertently dislodged from the hook, a second clip in the form of a loop having opposite ends between which is sandwiched an edge of a garment, such as a pocket edge of buoyancy control device (BCD), at least one fastener spanning the ends of the second clip and penetrating the garment edge to create a generally permanent connection between the second clip and the BCD pocket, and a releasable connector between the second clip and the second end of the lanyard whereby the implement is positively and permanently secured to the BCD and can be retained in the pocket thereof yet by quickly manually releasing the releasable connector, the implement can be quickly removed from (or reconnected to) the second clip.

28 Claims, 3 Drawing Sheets

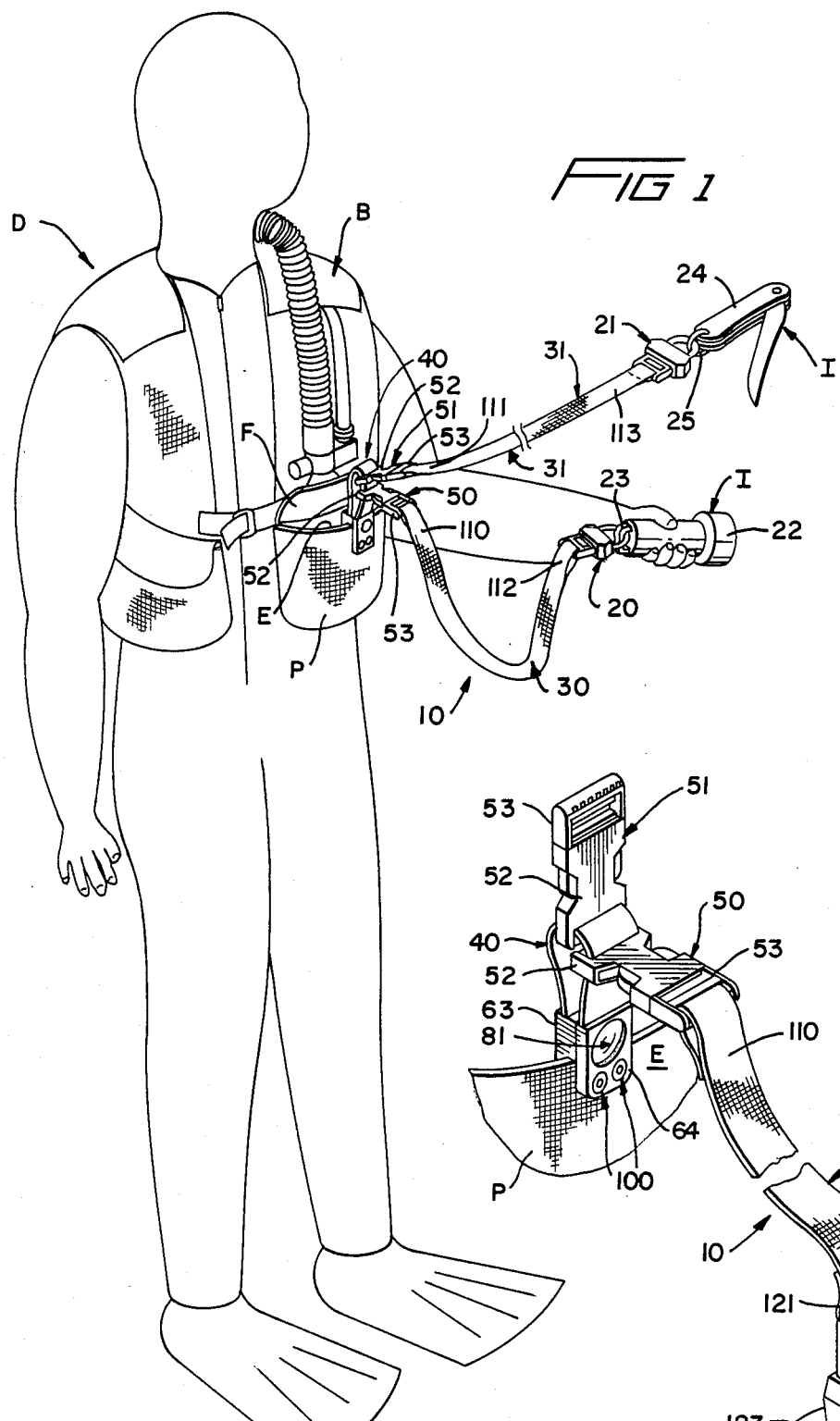

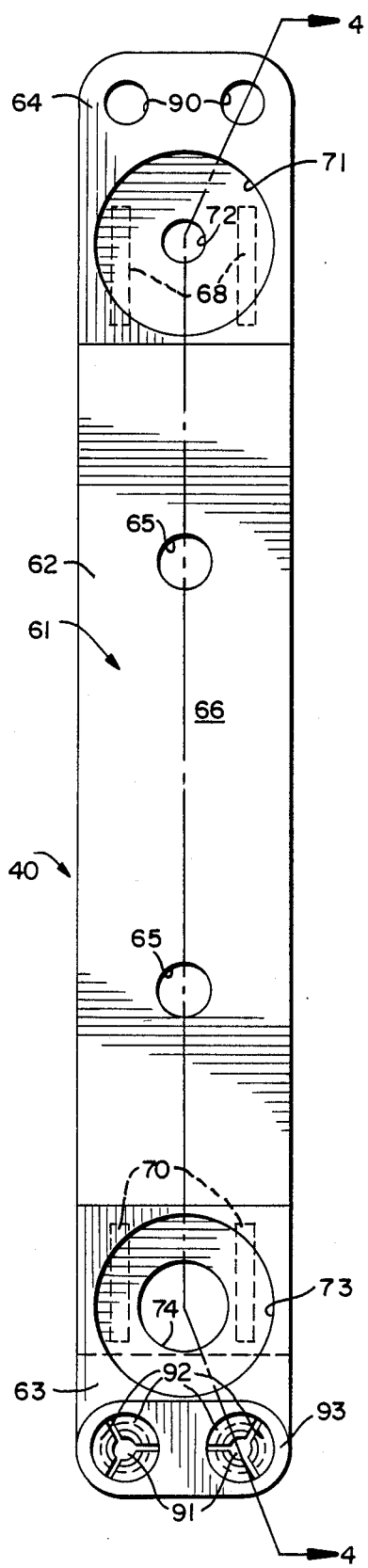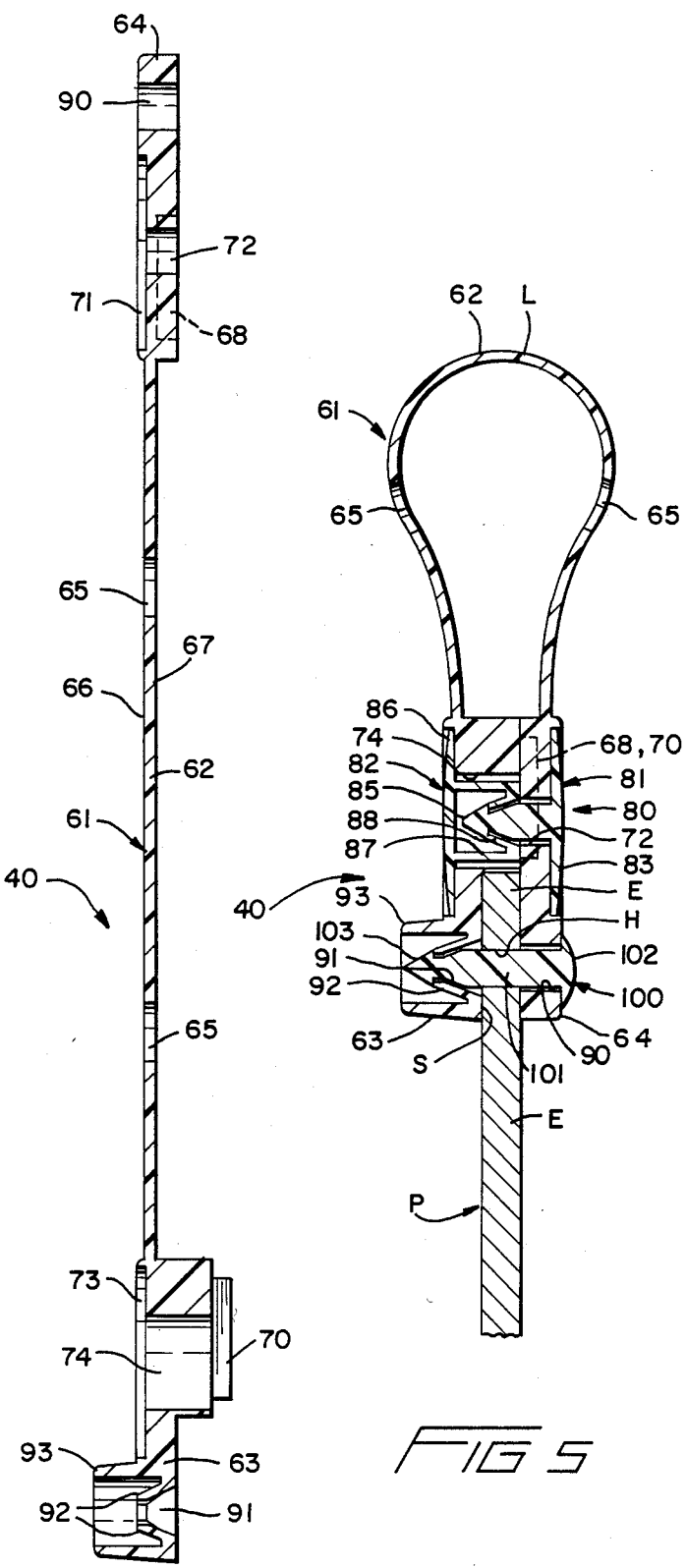

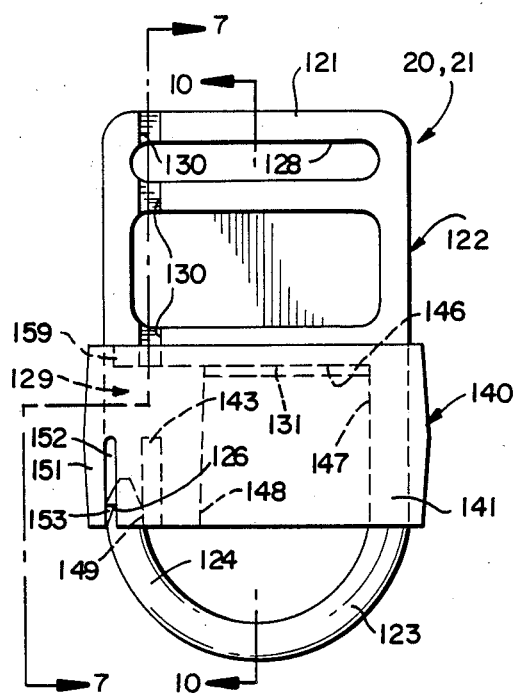
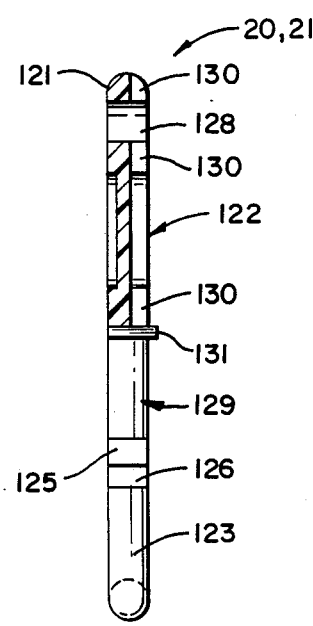
FIG 6
FIG 7
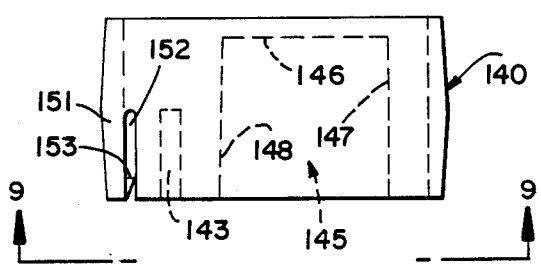
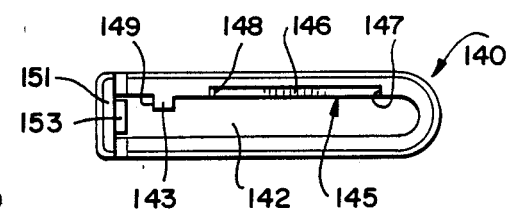
FIG 8
FIG 9
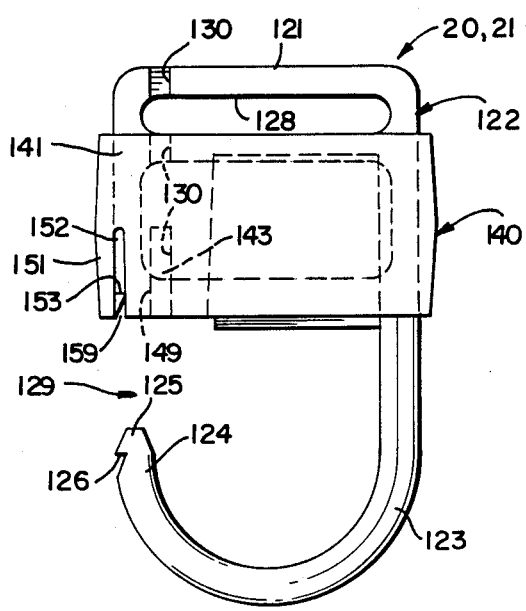
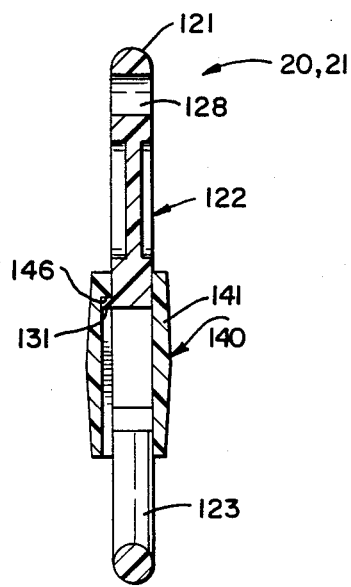
FIG 11
FIG 10

RETENTION SYSTEM FOR DIVER ACCESSORIES

BACKGROUND OF THE INVENTION

The present invention is directed to a retention system which will retain dive accessories, such as diver lights, slates, knives, etc. in ready proximity to the user (diver). Conventional retention systems of this type generally include a lanyard which at one end is looped to connect the lanyard to the wrist of the diver or associated dive gear, such as a dive belt. An opposite end of the lanyard can be directly connected to a dive accessory, such as a dive light, dive computer, compass board or the like. The lanyard may also be provided with a releasable connector between its ends. A conventional retention system of this type offers little flexibility, is particularly inconvenient when used as a wrist lanyard, and is highly susceptible to loss.

SUMMARY OF THE INVENTION

The retention system of the present invention includes one lanyard, although two or more lanyard of the same or differing lengths can be utilized in a selective fashion as circumstances dictate. Each lanyard has opposite first and second ends, and at the first end of each lanyard is a first clip formed by a clip body having a hook defining a throat through which implements can be applied to or removed from the hook. A fastener is slidably mounted upon the first clip body for movement between an open position at which implements can be applied to or removed from the hook and a closed position at which inadvertent or accidental removal of the implements, such as dive lights, slates, dive computers, knives, compass boards, or the like, is precluded. Each lanyard second end is connected to a second clip through a releasable connector, such as a "Fastex" ® connector which permits the lanyard and any implement carried thereby to be rapidly and readily removed from or reattached to the second clip. Additional releasable connectors are also connected to the second clip for the additional lanyards and the implements carried thereby.

The second clip is an elongated body having opposite first and second ends which when brought into contiguous relationship impart a generally loop configuration to the second clip. The ends sandwich therebetween a portion of a diver's garment, such as a pocket edge of a Buoyancy Control Device (BCD). Fasteners pass through openings of the first and second ends of the second clip and penetrate the BCD pocket to relatively permanently attach the second clip thereto. Due to the construction of the retention system in the manner aforesaid, the implements can be stored in the BCD pocket(s) when not in use, yet they are readily accessible in a convenient and unobtrusive manner. Furthermore, due to the releasable connectors, each lanyard can be readily, manually released from the second clip and reapplied thereto without in any fashion adversely effecting the generally permanent connection of the second clip to the BCD pocket. In this fashion the retention system is universally applicable to virtually all dive equipment and allows quick release to interchange dive accessories/implements, as when sharing accessories with a buddy while diving, and such functions are effected in a highly efficient and facile manner. The retention system offers excellent security because of the slidable fastener associated with the first clip which is positively locked in its closed position. Additionally, the lanyard are constructed of nylon web and resist tangling while the varying lanyard lengths thereof adapt the retention system to the particular dive accessory being utilized with a particular lanyard. The retention system is also ideal for dive instructors during the organized use of training modules.

BRIEF DESCRIPTION OF THE DRAWINGS

FIG. 1 is a perspective view of a diver wearing a BCD, and illustrates the retention system of the present invention secured to an edge of a pocket of the BCD by a clip which in turn carries two quick-release connectors and each of the latter carries a lanyard to which is attached by another clip a diver's accessory/implement.

FIG. 2 is an enlarged fragmentary perspective view of the retention system of FIG. 1 with one of the lanyards removed, and illustrates the details of the components thereof.

FIG. 3 is a top plan view of the clip which secures the retention system to the BCD, and illustrates a plurality of alignable openings through which fasteners are passed to secure the clip to the BCD, and preferably to the edge of the pocket thereof.

FIG. 4 is a cross-sectional view taken generally along line 4—4 of FIG. 3, and illustrates registrable tongues and grooves which are in engagement with each other to maintain the openings in alignment/registry incident to securing the clip to the pocket edge.

FIG. 5 is cross-sectional view taken generally along the same line as FIG. 4, and illustrates the clip after having been formed to a looped configuration sandwiching the pocket edge between ends of the clip and one of a pair of fasteners passing through the pocket edge and securing the clip thereto.

FIG. 6 is a front elevational view of the implement clip to which the diver's accessories/implements are attached, as shown in FIG. 2, and illustrates a clip body having a hook terminating in an end defining a throat which is illustrated closed by a reciprocally slidable fastener.

FIG. 7 is a cross-sectional view taken generally along line 7—7 of FIG. 6, and illustrates a stop carried by the clip body for preventing inadvertent removal of the slide fastener in one direction of movement thereof.

FIG. 8 is a side elevational view of the slide fastener, and illustrates a resilient arm carrying a tongue which locks with the hook end in the closed position.

FIG. 9 is an end elevational view of the slide fastener looking from bottom-to-top in FIG. 8, and illustrates a guide tongue which cooperates with a guide groove of the clip body and a stop surface which cooperates with the stop of the clip body.

FIG. 10 is a cross-sectional view taken generally along line 10—10 of FIG. 6, and illustrates the clip body stop and slide fastener stop in abutment preventing downward movement of the slide fastener, as viewed in FIGS. 6 and 10.

FIG. 11 is a front elevational view of the clip of FIG. 6, and illustrates the slide fastener in its open position at which implements can be moved through the throat for insertion upon or removal from the hook.

With the above and other objects in view that will hereafter appear, the nature of the invention will be more clearly understood by reference to the following detailed description, the appended claims and the several views illustrated in the accompanying drawings.

DESCRIPTION OF THE PREFERRED EMBODIMENT

A diver D is illustrated in FIG. 1 wearing Buoyancy Control Device (BCD) B which includes one or more pockets of which one pocket is designated by the reference character P. The pocket P includes a flap or closure F and an upper edge or edge portion E. The pocket P and various other unnumbered pockets of the BCD B house any one or many of a variety of diver accessories/implements, such as a dive knife, slate, etc. Such accessories should, of course, be readily accessible, yet safely retained to preclude loss, and in accordance with the latter objectives and those earlier noted herein, the present invention provides a novel retention system for such diver's accessories/implements which is generally designated by the reference designated by the reference numeral 10.

The retention system 10 includes first identical clip means 20, 21 (FIGS. 1 and 2) for securing thereto a variety of diver accessories or implements I, such as the illustrated dive light 22 secured by a bail 23 to the first clip means or clip 20 and a dive knife 24 secured by a bail 25 to the clip or clip means 21. A lanyard 30 is connected to the first clip 20 and a lanyard 31 is connected to the clip 21. The lanyards 30, 31 are made of nylon webbing and are generally identical except the lengths thereof vary, as might also the colors.

Second clip means or a clip 40 generally permanently secures both of the lanyards 30, 31 to the pocket edge E of the BCD pocket P in a manner to be described more fully hereinafter through respective first and second releasable connecting means or connectors 50, 51, which are conventional "Fastex" ® connectors of the type disclosed in U.S. Pat. No. 4,150,464, the content of which is incorporated hereat by reference.

Reference is now particularly made to FIGS. 3 through 5 of the drawings which illustrate the clip means 40 in the form of a relatively elongated strip or body 61 of nylon material having a medial portion 62 and opposite ends or end portions 63, 64. The medial portion 62 is provided with identical aperture means in the form of circular openings 65 which can be utilized for a variety of purposes including securing short-length small diameter lanyards thereto directly or through conventional hooks. The openings 65 basically function as auxiliary attaching points and are as the discretion of the diver dictates.

The clip body 61 includes an upper surface 66 and a lower surface 67 which through the medial portion 62 define a generally thin uniform thickness which is enlarged at each of the ends 63, 64, as is readily apparent from FIG. 4. At the end 64, the surface 66 is interrupted by two generally parallel grooves or slots 68 which are of a size, depth and configuration to accommodate two complementary contoured downwardly (FIG. 4) projecting tongues or projections 70. The top surface 66 at the end 64 includes a relatively large circular recess 71 through which passes a coaxial opening, aperture or bore 72 with the axes of the recess 71 and the bore 72 being coincident and lying midway between the grooves 68, 68, as is best illustrated in FIG. 3. The upper surface 66 at the clip body end 63 likewise includes a circular recess 73 and a larger aperture, opening or bore 74 with the axes of the latter likewise being coincident and being midway between the tongues or projections 70, again as is best illustrated in FIG. 3. The nylon material of the clip body 61 is relatively flexible and permits the same to be readily formed to the looped configuration shown in FIG. 5 at which time the ends or end portions 63, 64 are in generally contiguous relationship with the tongues 70 nested in the grooves 68. Due to the latter nesting relationship of the tongues 70 in the grooves 68, the axes of the bores 72, 74 are aligned and function to collectively define means for receiving conventional fastening means 80 defined by a male fastener 81 and a female fastener 82 (FIG. 5). The male fastener 81 includes a head 83, a stem 84 of a frustro-conical configuration and a terminal conical end 85. The female fastener 82 likewise includes a circular head 86, a hollow annular wall 87 and a plurality of resilient fingers 88 directed toward the head 86. The terminal conical end 85 of the male fastener 81 will conventionally pass through the fingers 88 by deflecting the latter radially outwardly and when the terminal conical end 85 passes beyond the fingers 88, the latter spring-back beneath the terminal conical end 85 to lock the fingers 88 in the manner clearly apparent from FIG. 5. In this manner longitudinal alignment of the clip body 61 is assured by the interengagement between the tongues 70 and the grooves 68 which assures that opposite longitudinal edges (unnumbered) of the medial portion 62 defining the loop L are in parallelism. This utilization of the fastening means 80 prior to securing the clip 40 to the pocket edge E also establishes a space S between the end portions 63, 64 of a predetermined size into which the edge E can be inserted prior to being permanently fastened thereto, as will be described immediately hereinafter.

The end 64 of the clip body 61 also includes a pair of openings 90, each of which is in alignment with one of a pair of openings 91 of the clip body end 63. The openings 90, 91 are placed in accurate concentric registry with each other through the intermediary of the tongues 70 and grooves 68 heretofore defined. The latter relationship is, of course, maintained by the fastening means 80. Each opening 91 is defined by a plurality of fingers 92 which are in turn surrounded by a generally cylindrical or annular wall 93.

After the loop L has been formed from the medial portion 62 of the clip body 61 and the fastening means 80 has been fastened thereto to define the space S, the clip 40 is attached to the edge E of the pocket P of the BCD B by sliding the edge E into the space S, as is evident from FIG. 5. After the edge E has been fully inserted in the slot S, a tool (not shown), such as a punch, nail, small screwdriver or the like, is inserted through any of the openings 90, 91 to puncture the edge E forming a pair of holes H (only one of which is illustrated) in the edge E which will pass therethrough a stem 101 of a male fastener 100. Each male fastener includes a head 102 and an opposite terminal conical end 103 which is lockingly restrained from removal by the flexible fingers 92. Each terminal conical end 103 is also fully housed within its associated cylindrical wall 93. However, in this fashion the pair of fasteners or fastening means 100 effect a generally permanent connection of the clip 40 to the edge E of the pocket P.

Though the releasable connecting means or connectors 50, 51 are not shown in FIG. 5, it is to be understood that these are slid over the thinner end portion 64 of the clip body 61 before the ends 63, 64 are brought into abutting and/or contiguous relationship to form the loop L and, of course, before fastening the ends 63, 64 to each other by the fastening means 80. In other words, the releasable connectors 50, 51 are attached to the medial portion 62 of the clip 40 before the loop is formed and before the clip 40 is attached to the edge E of the pocket P by the fastening means 100. The clip 40 is illustrated entrained about bails (unnumbered) of female members 52 of each of the connectors 50, 51, while ends 110, 111 of the respective lanyards 30, 31 are threaded through the bails (unnumbered) of male members 53 of the connectors 50, 51, respectively. The ends 110, 111 are merely sewn each upon itself to prevent disassembly from the associated bail (unnumbered) of the male members 53 of each of the connectors 50, 51. However, upon releasing the connector members 52, 53 from each other the lanyards 30, 31 and the associated respective dive light 22 and knife 24 can be, for example, handed to a buddy diver. When not in use, the implements I and the associated lanyards 30, 31 are, of course, stored in the pocket P of the BCD B, or any other pockets thereof.

Opposite ends 112, 113 of the respective lanyards 30, 31 are connected to bails 121 of the identical clip means or clips 20, 21. The bail 121 is a portion of a clip body 122 formed of relatively strong nylon and having a hook 123 terminating in a terminal end portion 124 having a tapered nose 125 and an undercut or slot 126. A slot 128 is formed in the clip body 122 for threading the lanyard ends 112, 113 therethrough incident to sewing the material of the lanyard 30, 31 to itself to permanently attach the lanyards 30, 31 by the respective ends 112, 113 to the clip bodies 122 of the respective clips 20, 21. Guide means in the form of a discontinuous groove 130 is formed in the upper face or surface (unnumbered) of the clip body 122, as viewed in FIG. 6. Stop means in the form of a projection or ledge 131, projects upwardly, as viewed in FIG. 6, and to the right, as viewed in FIG. 7, and cooperates with reciprocally slidable fastener means 140 in the form of a generally annular fastener body 141 in a manner which will be more apparent immediately hereinafter.

The fastener body 141 includes an interior through opening 142 (FIG. 9) which is peripherally contoured to the general peripheral configuration of the exterior surface of the clip body 122. Thus the fastener body 141 can be readily slid upon the clip body 122 from above, as viewed in FIGS. 6 and 11. During this slidable assembly, a tongue 143 projects into the through opening 142 (FIG. 9) and is of a size, depth and configuration to mate with the discontinuous groove 130. The tongue 143 slides along the discontinuous groove 130 during the downward motion of the fastener body 141 upon assembly of the fastener body 141. The through opening 142 is also formed with a shallow recess 145 defined by stop means in the form of a stop wall 146, a wall 147 generally normal thereto and a slightly tapered wall 148 (FIG. 6). The length of the stop wall 146 corresponds generally to the length of the projection or ledge 131 and the depth of the recess 145 accommodates the projection or ledge 131. As the fastener body 141 is slid upon the clip body 122 from top-to-bottom in FIG. 6, the downwardly (FIG. 6) diverging walls 147, 148 readily accommodate the length of the projection or ledge 131 which progressively moves therealong until the stop wall 146 abuts the ledge 131 and prevents further downward movement, as viewed in FIG. 6, of the fastener body 141. The latter position is illustrated in FIG. 6 and constitutes the closed position of the clips 20, 21 in which the throat 129 is closed to prevent the implements I from being inadvertently or accidentally removed from the hook 123. Moreover, abutment means in the form of an abutment surface 149 (FIGS 6 and 7) of the tongue 143 engages the terminal end portion 124 of the hook 123 in the closed position (FIG. 6), and prevents the terminal end portion 124 of the hook 123 from inadvertently deflecting thereby assuring that accessories/implements I will not be accidentally slipped-off the hook 123. When the fastener body 141 is slid in the opposite direction from the position shown in FIG. 6 to the position shown in FIG. 11, the throat 129 is opened and implements I can be inserted through the throat and positioned upon the hook 123 or removed therefrom.

The slidable fastener body 141 also includes a depending leg 151 which is somewhat flexible because of the relatively thin nature thereof as defined by a slot 152. The leg 151 carries stop means at a terminal lower end (unnumbered) in the form of a nose or projection 153 which cooperates with the undercut 126 of the hook terminal end portion 124 to prevent the fastener body 141 from inadvertently or accidentally moving upwardly, as viewed in FIG. 6, from the closed position thereof. However, by inserting a tool, such as the pointed end of the dive knife 24 into the slot 152, the leg 151 can be temporarily flexed to the left, as viewed in FIG. 6, disengaging the nose 153 and the undercut 126 to permit the fastener body 141 to be slid upwardly from the closed position of FIG. 6 to the opened position of FIG. 11 at which implements can be removed from or inserted upon the hook 123.

The nose or projection 153 is also aligned with a notch 159 in the lower left-hand corner (unnumbered) of the clip body 122, as viewed in FIG. 6. The notch 159 is of a length, as measured in the direction of the sliding motion of the fastener body 141, to fully accommodate the nose or projection 153 therein (FIG. 11) when the fastener body 141 is in its fully opened position. The notch 159 and its alignment with the nose or projection 153 performs two functions, namely, the nose 153 bottoms in the notch 159 and, therefore, functions as stop means to prevent the fastener body 141 from being inadvertently removed from the clip body 122 during upward movement of the fastener body 141, as viewed in FIG. 6. Therefore, when the fastener body 141 is moved to its open position (FIG. 11), the fastener body 141 can not be inadvertently or accidentally moved beyond the full-open position shown in FIG. 11. Moreover, in the absence of the notch 159 the throat 129 would not be as large as illustrated in FIG. 8 because the nose 153 would otherwise bottom against the unnotched lower left-hand corner of the clip body 122 which would thereby effectively lessen the size of the throat 129 by the length of the nose 153, as measured in the direction of sliding movement of the fastener body 141. However, since the nose 153 is fully accommodated by its entire length in the notch 159, the throat 129 is of an optimum size to facilitate the insertion of the implements I upon or the removal thereof from the hook 123. Obviously, when a tool is inserted in the slot 152 and the leg 151 is flexed to the left, as viewed in FIG. 6, the nose 153 can be removed from the notch 159 to remove the fastener body 141 from the clip 122 in an upward direction, as viewed in FIG. 6 of the drawings.

From the foregoing, it is readily apparent that one, two or more lanyards 30, 31, for example, forming part of the retention system 10 can be both simultaneously or each individually releasably fastened to and carried by the clip 40 through the respective releasable connecting means 50, 51. Furthermore, should the releasable connecting means 50, 51 be removed and/or reattached at any time by separating the male members 53 from the female members 52, this releasable connection/disconnection has no effect whatever upon the relatively permanent connection of the clip 40 to the edge E of the pocket P. Thus, the clip means 40 assures permanent and positive connection of the overall system 10 to the edge E of the pocket P, yet the releasable connecting means 50, 51 permits virtually an endless variety of lanyards and implements to be connected thereto. Obviously, each of the identical clip means 20, 21 also permits a virtually endless variety of implements I to be connected thereto. Hence, the overall retention system 10 assures positive securement to the diver's garment, the BCD B for example, yet does so with universal flexibility and separability through the utilization of the connectors 50, 51 and the clips 20, 21.

Although a preferred embodiment of the invention has been specifically illustrated and described herein, it is to be understood that minor variations may be made in the apparatus without departing from the spirit and scope of the invention, as defined in the appended claims.

I claim:

1. A retention system comprising a lanyard having opposite relatively spaced first and second ends, first clip means at said lanyard first end for securing an implement thereto, second clip means at said second lanyard end for securing said lanyard to a garment whereby the lanyard retains the implement connected to the garment, releasable connecting means disposed between said second clip means and said second lanyard end for releasing said lanyard from said second clip means without affecting the secured connection between said second clip means and garment said first clip means includes relatively releasable fastener means for relatively releasably fastening an implement to said lanyard, and said second clip means includes relatively permanently fastened fastener means for relatively permanently fastening said second clip means to a garment.

2. The retention system as defined in claim 1 wherein said first clip means includes slidable fastener means for effecting slidable opening and closing of said first clip means for applying and removing the implement relative thereto.

3. The retention system as defined in claim 1 wherein said first clip means includes a hook.

4. The retention system as defined in claim 1 wherein said first clip means includes a hook having a terminal end portion defining an open throat through which an implement can be entrained upon said hook, and first clip means further includes movable fastener means for selectively closing said throat.

5. The retention system as defined in claim 1 wherein said first clip means includes a hook having a terminal end portion defining an open throat through which an implement can be entrained upon said hook, and said first clip means further includes slidable fastener means for selectively closing said throat.

6. The retention system as defined in claim 1 wherein said first clip means includes slidable fastener means for effecting slidable opening and closing of said first clip means for applying and removing the implement relative thereto, and means for releasably locking said slidable fastener means in the closed position of said first clip means.

7. The retention system as defined in claim 1 wherein said first clip means includes slidable fastener means for effecting slidable opening and closing of said first clip means for applying and removing the implement relative thereto, and stop means for limiting the sliding movement of said slidable fastener means in at least one direction of movement thereof.

8. The retention system as defined in claim 1 including second releasable connecting means carried by said second clip means for releasably connecting thereto another implement.

9. The retention system as defined in claim 1 including second releasable connecting means carried by said second clip means for releasably connecting thereto another lanyard.

10. The retention system as defined in claim 1 including a second lanyard having opposite relatively spaced first and second ends, third clip means at said second lanyard first end for securing another implement thereto, and second releasable connecting means disposed between said second clip means and said second lanyard second end for releasing said second lanyard from said second clip means without affecting the secured connection between said second clip means and garment.

11. The retention system as defined in claim 1 wherein said first clip means includes a clip body having a hook with a terminal end portion and a fastener reciprocally slidable upon said clip body between a closed position closing a throat of said hook and an open position said throat, and means of said fastener for preventing deflection of said hook terminal end portion in said closed position.

12. The retention system as defined in claim 1 wherein said first clip means includes a clip body having a hook and a fastener reciprocally slidable upon said clip body between a closed position closing a throat of said hook and an open position opening said throat, and means for locking said fastener in said closed position.

13. The retention system as defined in claim 1 wherein said first clip means includes a clip body having a hook and a fastener reciprocally slidable upon said clip body between a closed position closing a throat of said hook and an open position opening said throat, and means for preventing inadvertent disassembly of said fastener relative to said clip body in either direction of sliding movement of said fastener.

14. The retention system as defined in claim 1 wherein said second clip means includes a loop member having ends between which a garment is adapted to be sandwiched, and fastener means for relatively permanently fastening said ends together and spanning the garment to hold the garment relatively permanently fastened in sandwiched relationship between said loop member ends.

15. The retention system as defined in claim 1 wherein said second clip means includes a loop member having ends between which a garment is adapted to be sandwiched, fastener means for relatively permanently fastening said ends together and spanning the garment to hold the garment relatively permanently fastened in sandwiched relationship between said loop member ends, said releasable connecting means includes first and second relatively releasable connecting members, said first releasable connecting member being connected to said loop, and said second releasable connecting member being connected to said lanyard second end.

16. The retention system as defined in claim 15, wherein said first clip means includes a clip body having a hook with a terminal end portion and a fastener reciprocally slidable upon said clip body between a closed position closing a throat of said hook and an open position opening said throat, and means of said fastener for preventing deflection of said hook terminal end portion in said closed position.

17. The retention system as defined in claim 16 including a second lanyard having opposite relative spaced first and second ends, third clip means at said second lanyard first end for securing another implement thereto, and second releasable connecting means disposed between said second clip means and said second lanyard second end for releasing said second lanyard from said second clip means without effecting the secured connection between said second clip means and garment.

18. A retention system comprising a lanyard having opposite relatively spaced first and second ends, a first clip at said lanyard first end for securing an implement thereto, a second clip at said second lanyard end for securing said lanyard to a garment whereby the lanyard retains the implement connected to the garment, releasable connecting means disposed between said second clip and said second lanyard end for releasing said lanyard from said second clip without affecting the secured connection between said second clip and garment, said first clip includes relatively releasable fastener means for relatively releasably fastening an implement to said lanyard, said second clip includes relatively permanently fastened fastener means for relatively permanently fastening said second clip to a garment, said second clip including a generally elongated resilient clip body having opposite spaced first and second end portions, said first and second end portions being adapted to be brought into contiguous relationship whereby a garment can be sandwiched therebetween, a first pair of fastener receiving openings, said first pair of fastener-receiving openings being located one each in said respective first and second end portions and being generally aligned when said first and second end portions are in contiguous relationship to each other, and fastener means for spanning said pair of fastener-receiving openings and passing through an associated garment while sandwiched between said clip body first and second end portions.

19. The retention system as defined in claim 18 including means for maintaining said pair of fastener-receiving openings in alignment with each other when said clip body is in the form of a loop with said first and second end portions in contiguous relationship.

20. The retention system as defined in claim 19 including a second pair of fastener-receiving openings, said second pair of fastener-receiving openings being located on each in said respective first and second end portions and being generally aligned when said first and second end portions are in contiguous relationship to each other, and other fastener means for spanning said second pair of fastener-receiving openings without passing through the associated garment.

21. The retention system as defined in claim 19 wherein said clip body includes a medial portion between said first and second end portions, and aperture means in said medial portion for tethering articles thereto.

22. The retention system as defined in claim 18 including a second pair of fastener-receiving openings, said second pair of fastener-receiving openings being located on each in said respective first and second end portions and being generally aligned when said first and second end portions are in contiguous relationship to each other, and other fastener means for spanning said second pair of fastener-receiving openings without passing through the associated garment.

23. The retention system as defined in claim 18 wherein said clip body includes a medial portion between said first and second end portions, and aperture means in said medial portion for tethering articles thereto.

24. The retention system as defined in claim 18 wherein said clip body includes a medial portion between said first and second end portions, and a plurality of aperture means in said medial portion for tethering articles thereto.

25. The retention system as defined in claim 18 wherein said clip body includes a medial portion between said first and second end portions, and a pair of generally aligned aperture means in said medial portion for tethering articles thereto.

26. A retention system comprising a lanyard having opposite relatively spaced first and second ends, a first clip at said lanyard first end for securing an implement thereto, a second clip at said second lanyard end for securing said lanyard to a garment whereby the lanyard retains the implement connected to the garment, releasable connecting means disposed between said second clip and said second lanyard end for releasing said lanyard from said second clip without affecting the secured connection between said second clip and garment, said first clip includes relatively releasable fastener means for relatively releasably fastening an implement to said lanyard, said second clip includes relatively permanently fastened fastener means for relatively permanently fastening said second clip to a garment, said second clip including a generally elongated resilient clip body having opposite spaced first and second end portions, said first and second end portions being adapted to be brought into contiguous relationship whereby a garment can be sandwiched therebetween, a first pair of fastener receiving openings, said first pair of fastener-receiving openings being located one each in said respective first and second end portions and being generally aligned when said first and second end portions are in contiguous relationship to each other, fastener means for spanning said pair of fastener-receiving openings and passing through an associated garment while sandwiched between said clip body first and second end portions, means for maintaining said pair of fastener-receiving openings in alignment with each other when said clip body is in the form of a loop with said first and second end portions in contiguous relationship, said alignment maintaining means include a tongue and groove carried one by each of said first and second end portions, and said tongue and groove are engaged with each other when said first and second end portions are in contiguous relationship to each other.

27. The clip as defined in claim 26 including a second pair of fastener-receiving openings, said second pair of fastener-receiving openings being located one each in said respective first and second end portions and being generally aligned when said first and second end portions are in contiguous relationship to each other, and other fastener means for spanning said second pair of fastener-receiving openings without passing through the associated garment.

28. The clip as defined in claim 26 wherein said clip body includes a medial portion between said first and second end portions, and aperture means in said medial portion for tethering articles thereto.

* * * * *